United States Patent [19]

Contoyonis

[11] Patent Number: 4,656,899

[45] Date of Patent: Apr. 14, 1987

[54] SILENCER BAND

[75] Inventor: Peter Contoyonis, Libertyville, Ill.

[73] Assignee: Ammco Tools, Inc., North Chicago, Ill.

[21] Appl. No.: 856,173

[22] Filed: Apr. 28, 1986

[51] Int. Cl.[4] .............................................. F16F 15/12
[52] U.S. Cl. .................................... 82/34 R; 24/519; 24/546; 24/563; 74/574; 82/4 A; 82/DIG. 9; 188/218 A
[58] Field of Search .................... 24/519, 546, 563; 74/574; 82/34 R, 4 A, DIG. 9; 188/218 A

[56]        References Cited
       U.S. PATENT DOCUMENTS

| | | | |
|---|---|---|---|
| 2,049,660 | 8/1936 | Patten | 24/563 |
| 2,570,670 | 10/1951 | Harold | 24/546 |
| 2,781,566 | 2/1957 | Hammer | 24/546 |
| 3,217,369 | 11/1965 | Sacean | 24/546 |
| 3,611,830 | 10/1971 | Shank | 74/574 |
| 3,774,472 | 11/1973 | Mitchell | 74/574 |
| 3,774,473 | 11/1973 | Mitchell | 74/574 |
| 3,901,046 | 8/1975 | Hofmann | 74/574 |
| 4,556,130 | 12/1985 | Puszakowski | 82/4 A |

Primary Examiner—Nicholas P. Godici
Assistant Examiner—Jerry Kearns
Attorney, Agent, or Firm—Edmond T. Patnaude

[57] ABSTRACT

Opposite ends of a silencer band having a plurality of weights attached thereto are coupled together by selective engagement of a clip member and one of the silencer band weights. To effect such engagement, the clip member comprises a connection portion including a pair of first leg members and an interconnecting first bight portion which together define a loop. Instead of being riveted to the silencer band, the clip member is also fixedly attached to another one of the silencer band weights by an attachment portion. The attachment portion includes second and third leg members each extending from one of the end portions of the first leg members and arranged in predetermined spaced apart parallel relation one to another. A fourth leg member reversely depends from the third leg member and defines a second bight portion. The fourth leg member extends into the space defined by the second and third leg members and has a free end extending generally in the direction of the loop of the connection portion of the clip member. The free end of the fourth leg member is provided with a hook portion serving to engage a central web of one of the weights and thereby firmly securing the clip to the weight.

11 Claims, 6 Drawing Figures

U.S. Patent  Apr. 14, 1987  4,656,899
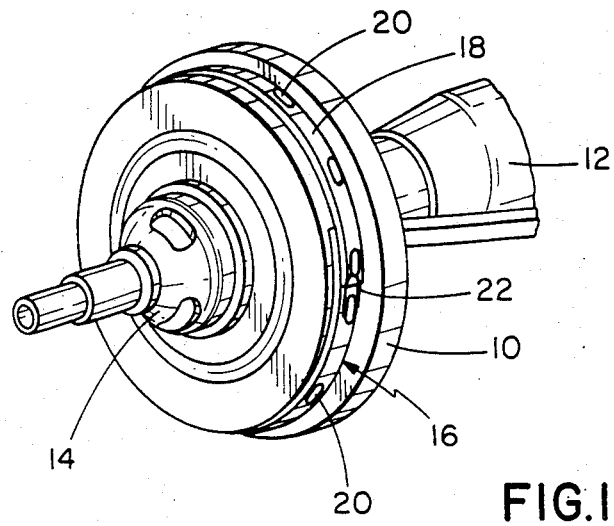
FIG.1
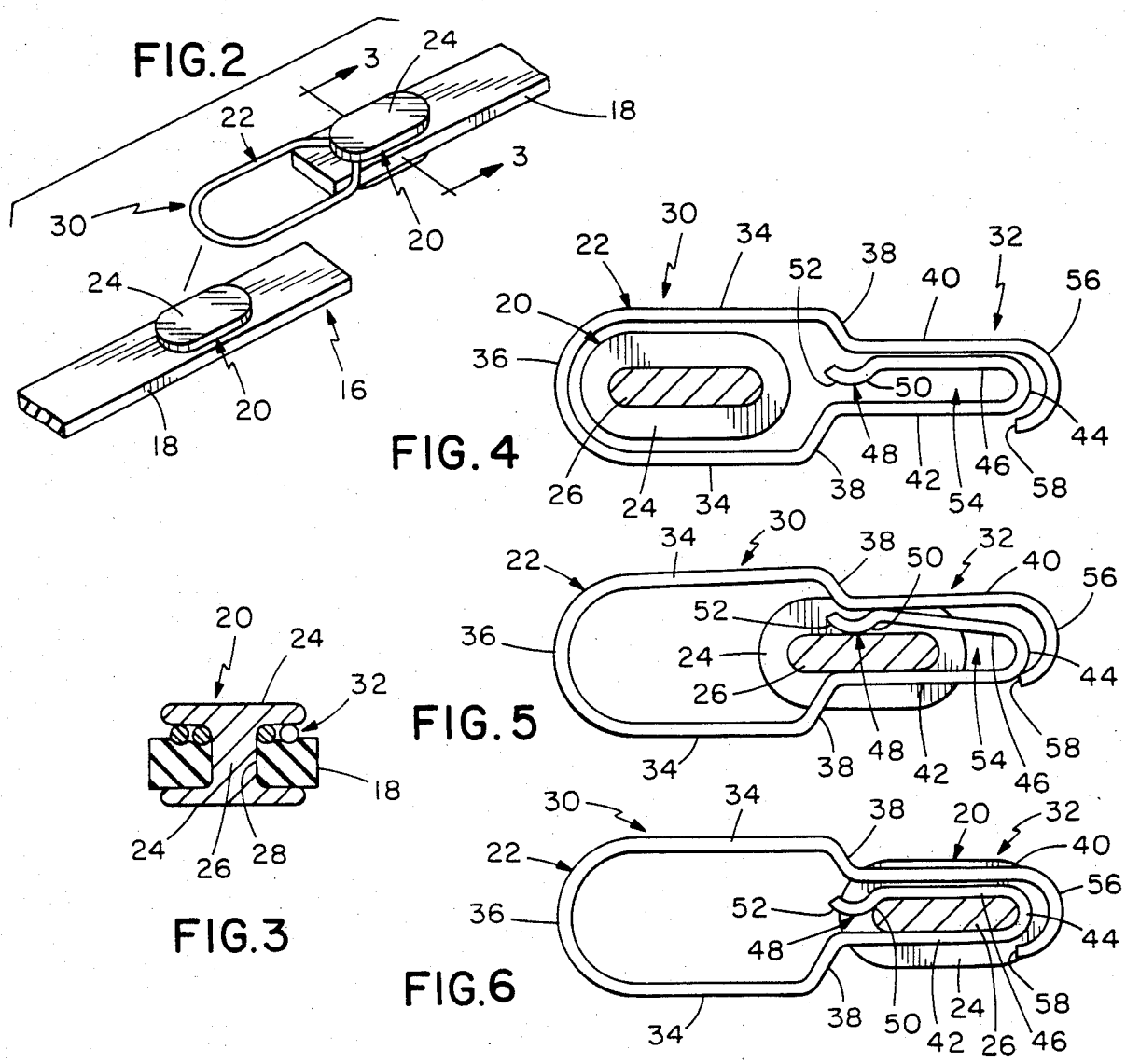
FIG.2
FIG.3
FIG.4
FIG.5
FIG.6

SILENCER BAND

BACKGROUND OF THE INVENTION

1. Field of the Invention

The present invention relates generally to an improved silencer band for damping vibrations in a work piece during the machining thereof, and it relates more particularly to a new and improved coupling member for convenient attachment of a silencer band to the work piece prior to the machining process.

2. Description of the Prior Art

Vibration of a work piece during its machining is a condition which often affects adversely the quality of the machining process. When a work piece is being turned on a lathe, for example, interaction of the cutting bit against the surface of the work can induce vibration in the work. If the frequency of the induced vibration is approximate to the natural frequency of vibration of the work itself, a resonant condition will be established whereby the work will reach an extreme vibration rendering it virtually impossible to obtain a uniform, smooth finish on the surface which is being turned. The foregoing problem associated with vibration is of particular concern in the turning of brake drums and rotors wherein a smooth surface finish is essential to prevent the premature wear of the brake shoe or pad, respectively, when the drum or rotor is subsequently placed in service.

To eliminate vibration of a drum or rotor during a surface machining process, a simple but effective silencer band may be employed comprising a belt to which a plurality of lead weights have been fixed at spaced intervals along the length thereof. The silencer band may be wrapped around the drum or rotor at an out-of-the-way position with the lead weights held in intimate contact with the drum or rotor. Because of their lead composition, the weights absorb the vibration of the drum or rotor and thereby prevent the occurrence of a resonant vibration condition. The typical silencer band currently in use has a belt member constructed of a suitable rubber or other elastic material such that it is adaptable for use with work pieces of varying dimensions. The ends of the belt are provided with suitable coupling means in the form of wire-formed clip members which cooperate to secure the ends of the belt together. In one widely used form of a silencer band, a loop-like clip member is fastened to one end of an elastic belt by means of a strap which wraps around and is riveted to the end of the belt. The band is installed by stretching it around an outer surface of a drum or rotor and securing the clip end of the band over one of the lead weights located near the opposite end of the band.

A disadvantage of the silencer band of the foregoing type is that its manufacturing cost is attributable in large part to the assembly time and material cost associated with fastening the loop-like clip member to the end of the belt. In the example described, the strap is a separate prefabricated member which must be properly aligned with the clip member and belt end, either by manual or automated methods, before it is riveted to the end of the belt. The riveting procedure, itself, involves multiple manual or automated operations. Accordingly, it would be desirable to reduce the materials and assembly operations necessary to fasten a clip member to the end of a silencer band belt, as heretofore described, whereby the silencer band is more economically manufactured and can be sold at a less expensive price.

SUMMARY OF THE INVENTION

Briefly there is provided in accordance with the teachings of the present invention a new and improved means for coupling the opposite ends of a silencer band wherein a novel clip member is fastened to the belt of the silencer band by cooperative engagement with one of the silencer band weights instead of by the prior art means of a metallic strap and rivets. The clip member of the present invention comprises a connection portion including a pair of first leg members and an interconnecting first bight portion which together define a loop. For fastening the clip member to one of the silencer band weights, the attachment portion includes second and third leg members each extending from one of the end portions of the first leg members. The second and third leg members are arranged in predetermined spaced apart parallel relation one to another. A fourth leg member reversely depends from the third leg member and defines a second bight portion. The fourth leg member extends into the space defined by the second and third leg members and has a free end extending generally in the direction of the loop of the connection portion of the clip. The free end of the fourth leg member is provided with a hook portion.

Since a typical lead weight for use in connection with a silencer band comprises a pair of generally flat, pad-like members disposed on opposite sides of the elastic belt and interconnected by a web, a clip member in accordance with the present invention is attachable to a weight by merely positioning the loop-shaped portion of the clip over one of the pads of the weight and drawing the clip lengthwise of the belt such that the attachment portion of the clip is moved into seated engagement with the web of the weight. The clip of the instant invention is therefore capable of being fastened to the belt in a simple and highly efficient manner resulting in significant economies in the manufacture of he silencer band.

BRIEF DESCRIPTION OF THE DRAWINGS

The foregoing and other novel features of the present invention will be better understood by a reading of the following detailed description taken in connection with the accompanying drawings wherein:

FIG. 1 is a fragmentary perspective view of a brake drum and lathe spindle arrangement illustrating use of a silencer band constructed in accordance with the principles of the invention.

FIG. 2 is a fragmentary perspective view illustrating the manner in which the ends of a silencer band may be coupled together through the use of a clip member constructed in accordance with the principles of the present invention;

FIG. 3 is a sectional view taken along the lines 3—3 of FIG. 2;

FIG. 4 is a top plan view, partially in section, showing the clip member of FIG. 2 in its initial stage of attachment to a weight of a silencer band;

FIG. 5 is a top plan view, partially in section, illustrating the clip of the instant invention in an intermediate stage of its attachment to a weight of a silencer band; and FIG. 6 is a top plan view, partially in section, of a clip of the instant invention as finally attached to a weight of a silencer band.

DETAILED DESCRIPTION OF THE INVENTION

Referring now to the drawings, and initially to FIG. 1, a typical vehicle brake drum 10 is shown as mounted to a spindle 12 by a suitable threaded collar member 14. Although the spindle 12 is illustrated in fragmentary form, in a usual brake drum turning apparatus, the spindle extends from a chuck of a lathe (not shown) thereby facilitating the mounting of the brake drum 10 for rotation. In a manner well known in the art, the brake drum turning apparatus further includes a boring bar (not shown) having a tool bit attached thereto reaching inwardly of the brake drum for machining the inner wall surface thereof. Wrapped around the outer surface of the brake drum 10 is a silencer band, designated generally be the reference numeral 16. The silencer band 16 comprises a belt 18 which is preferably constructed of a rubber or other elastic material such that it is stretchable longitudinally and thus is adaptable for use with brake drums or rotors of varying dimensions. Fixed to the belt 18 at spaced intervals along the length thereof are a plurality of lead weights 20 configured to bear against the outer surface of the drum 10, and damp vibrations caused by interaction of the cutting bit during the drum turning process. The ends of the belt 18 are coupled together by a clip member 22, the details of which will be described hereinafter.

Turning now to FIGS. 2 and 3, each of the lead weights 20 can be seen to include a pair of generally flat, elongated pad portions 24 interconnected by an integrally formed web 26. Attachment of the weights 20 to the belt 18 of the silencer band 16 is provided by elongate slots 28 formed at spaced intervals in the belt 18. Because the belt 18 is elastic in composition, the slots 28 may be dimensioned such that they correspond in approximate size to the dimensions of the web portions 26 of the weights 20, and thus the weights 20 may be mounted to the belt 18 by manually stretching the belt 18 whereupon each slot 28 becomes enlarged such that one of the pad portions 24 of the associated weight 20 can be inserted therethrough. Such a mounting arrangement for the weights 20 has proven to be not only convenient from the standpoint of assembly, but, in addition, it permits the silencer band 16 to be used reversibly with either side of the band 16 and weights 20 in contact with the drum or rotor being machined. Preferably, the belt 18 is terminated in proximity to one of the weights 20 thereby permitting a connection portion 30 of the clip member 22 to extend beyond the end of the belt 18 when the clip member 22 is attached to the weight 20. As best shown in FIG. 2, the connection portion 30 of the clip member 22 thereby projects sufficiently from the end of the belt 18 such that the connection portion 30 may be readily hooked over a pad member 42 and a second portion 52 which is generally directed away from the lower leg member 42. By the foregoing arrangement, the lower leg member 42, the bight portion 44, the intermediate leg member 46 and the hook member 48 cooperate to define a bounded interior space, designated generally by the reference numeral 54. Preferably, the dimensions of the latter elements of the attachment portion 32 are preselected such that the interior space 54 defined thereby approximates, in size and shape, the cross section of the web 26 of a weight 20. To complete the construction of the attachment portion 32 of the clip member 22, a bight portion 56 extends from the upper leg member 40 and wraps around the bight portion 44 which is formed between the lower leg member 42 and the intermediate leg member 46. For reasons which will be explained, hereinafter, the bight portion 56 is configured with a terminal end 58 disposed in close proximity to the juncture between lower leg member 42 and bight portion 44.

The functional aspects of the clip member construction can be readily appreciated upon examination of FIGS. 4, 5 and 6 wherein clip member 22 is shown in various stages of its connection to a silencer band weight 20. In a first stage, as illustrated in FIG. 4, the clip 22 is positioned on one of the flat sides of the silencer band belt 18 with the connection portion 30 of the clip member 22 circumlocated about one of the pad portions 24 of a weight 20. As shown in FIG. 5, the clip member 22 is then drawn longitudinally of the belt such that the hook member 48 of the attachment portion 32 of the clip member 22 comes into engagement with the web 26 of the weight portion 24 of a weight 20 disposed at the opposite end of the belt 18 when coupling of the belt ends is desired.

The details of the clip member 22 are most readily seen in the plan views of FIGS. 4, 5 and 6. Generally, the clip member 22 is a wire-formed structure having essentially two functionally distinct portions; namely, the aforementioned connection portion 30 and an attachment portion 32. The connection portion 30 includes a pair of leg members 34 arranged in spaced parallel relation and an interconnecting bight portion 36 which together define a loop. Opposite the bight end of the connection portion 30 the leg members 34 have end portions 38 which are turned generally inwardly of the space defined between leg members 34. The attachment portion 32 of the clip member 22 includes an upper leg member 40 and a lower leg member 42 as viewed in FIG. 4, for example, both of which extend from respective end portions 38 of the leg members 34. Like the leg members 34, the upper leg member 40 and lower leg member 42 are in parallel, spaced relation one to another. The lower leg member 42 extends away from the connection portion 30 of the clip member 22 and terminates in a bight portion 44 from which an intermediate leg member 46 extends. The intermediate leg member 46 is arranged in parallel relation to both the upper leg member 40 and the lower leg member 42 and extends to a longitudinal position which is in approximate alignment with the end portion 38 of the connection portion leg members 34, whereat it is terminated in a hook member 48. The hook member 48 is configured such that it comprises a first portion 50 which is generally directed toward the lower leg 20. Because the second portion 52 of the hook member 48 is directed generally away from the lower leg member 42 the hook member 48 rides over the web 26 causing the upper leg member 40 and lower leg member 42 to separate away from one another thereby allowing the web 26 to move into the interior space 54. In a finally seated position, as illustrated in FIG. 6, upper leg member 40 and lower leg member 42 assume their originally parallel orientation, and the web 26 is secured within the interior space 54 by entrapment between the bight portion 44 and hook member 48.

The composition and dimensional interrelationships between the several elements comprising the attachment portion 32 of the clip member 22 play an important role in the proper functioning of the attachment portion 32. For example, it is desirable that the upper leg member 40 and intermediate leg member 46 are arranged in closely spaced or contacting relation. Additionally, the bight portion 56 extending from the upper leg member 40 should preferably wrap around the bight portion 44 such that its terminal end 58 is positioned proximate to the juncture between the lower leg member 42 and the bight portion 44. Generally, a material composition for the clip member 22 should be selected such that the clip member 22 is relatively rigid but has a degree of resilience and thus at least the elements of the attachment portion 32 are capable of flexure. The result of the aforementioned cooperative interrelationship of elements is that once the clip member 22 is fixed to a weight 20, it is difficult to remove. More specifically, in order to remove the attachment portion 32 from the web 26, the upper leg member 40 must spread away from the lower member 42, which action is resisted by the natural resilience of the bight portion 44. In addition, because of the proximity of the upper leg member 40 to the intermediate leg member 46, leg members 34 must necessarily spread apart, and this action is resisted by the natural resilience of bight portion 36. Still further, interaction of the terminal end 58 with the bight portion 44 inhibits the leg members 34 from excessive spreading, and therefore, an entire section of the clip member 24, including upper leg member 40, adjoining end portion 38 and adjoining leg member 34, must bow outwardly under action of the hook end of intermediate leg member 46 before sufficient clearance is achieved between hook member 48 and lower leg member 42 for removal of the web 26 from the interior space 54.

It can be appreciated that the clip member 22 of the instant invention offers significant advantages over prior art means for coupling the ends of a silencer band together. The clip member 22 is a completely unitary structure which is readily manufactured by conventional wire forming techniques. Since it is directly connectable to one of the weights 20 of a typical silencer band 16, advantages of reduced cost can be achieved in the manufacture of the silencer band 16 by the elimination of separate attachment components such as rivets and straps. Although the clip member 22 is shown as being formed from round wire stock, the clip member 22 may be formed from stock having virtually any cross sectional shape and can even be a cast structure of plastic or other non-metallic composition. In the latter regard, it can also be appreciated that the clip member 22 of the instant invention is suitable for use in the coupling of other structural members in addition to silencer bands. Moreover, the connection portion 30 of the clip member 22 may be in any desired configuration as may be required to effect reliable coupling between the two structural members.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. A clip for coupling a first structural member to a second structural member comprising:
   an attachment portion for attachment of said clip to said first structural member and a connection portion for connecting said clip to said second structural member,
   said connection portion including a pair of first leg members having end portions projecting generally toward said attachment portion,
   said attachment portion including a second leg member and a third leg member each extending from a respective one of said end portions of said first leg members,
   said second and third leg members arranged in predetermined spaced apart relation one to another,
   a fourth leg member depending from said third leg member and connected thereto by a first bight portion, said fourth leg member extending into the space defined between said second and third leg members and having a distal end projecting generally in the direction of said connection portion, and
   said distal end of said fourth leg member being provided with a hook member comprising a first portion directed generally toward said third leg member and a second portion directed generally away from said third leg member.

2. A clip according to claim 1 further comprising
   a second bight portion depending from said second leg member and configured to wrap around the first bight portion.

3. A clip according to claim 2 wherein
   said first and second bight portions are configured to be in interengaged relationship when said second and third leg members are moved outwardly from said predetermined, spaced apart relationship.

4. A clip according to claim 1 wherein
   said attachment portion is constructed of a resiliently deformable material.

5. A clip according to claim 1 wherein
   said connection and attachment portions are constructed of a unitary wire form member.

6. A clip according to claim 1 wherein
   said second and third leg members are arranged in substantially parallel relation one to another.

7. A clip according to claim 1 wherein
   said second and fourth leg members are arranged in substantially parallel relation one to another.

8. A clip according to claim 7 wherein
   said second and fourth leg members are arranged in close proximity one to another.

9. A clip according to claim 1 wherein
   said connection portions further includes a third bight portion interconnecting said pair of first leg members.

10. A clip for coupling opposite ends of a silencer band of the type including a belt having a plurality of metallic weights mounted thereto at spaced intervals along the length thereof, the weights including a pair of pad portions interconnected by an integral web and the clip including a connection portion comprising a wireform loop for selective attachment of the clip to one of the weights to couple the ends of the band, the improvement residing in said clip and comprising
    a resilient wire-form attachment portion on said clip for attachment of said clip to a web of one of said weights,
    said attachment portion depending from said wireform loop and including a first leg member and a second leg member arranged in pre-selected substantially parallel spaced relation one to another,
    a third leg member reversely depending from said second leg member in close proximity to said first leg member and connected to said second leg member by a bight portion, said third leg member extending into the space defined between said first and second leg members and having a distal end, and a hook member depending from the distal end of said third leg member and having a first portion directed generally toward said second leg member and a second portion directed generally away from said second leg member, said second leg member, third leg member, bight portion and hook member all cooperating to define an interior bounded space approximating in size and shape the cross section of said web, whereupon when said clip is attached to the web of a weight, the second and third leg members move outwardly of one another by interaction of said hook member with said web, and said outward movement is resisted by interaction of said third leg member with said first leg member.

11. A silencer band for damping vibration in a workpiece during machining, the band comprising a belt having a plurality of lead weights attached thereto at spaced intervals along the length thereof, an end of the belt having a clip secured thereto, said clip including an attachment portion for securing said clip to said belt and a connection portion for selective engagement with a weight when coupling of the ends of the band is desired, the improvement comprising:

said connection portion including a pair of first leg members having end portions projecting generally toward said attachment portion, said attachment portion including a second leg member and a third leg member each extending from a respective one of said end portions of said first leg members, said second and third leg members arranged in predetermined spaced apart relation one to another, a fourth leg member depending from said third leg member and connected thereto by a bight portion, said fourth leg member extending into the space defined between said second and third leg members and having a distal end projecting generally in the direction of said connection portion, and said distal end of said fourth leg member having a hook member formed thereon, said hook member comprising a first portion directed generally toward said third leg member and a second portion directed generally away from said third leg member.

* * * * *